(12) United States Patent
Weaver

(10) Patent No.: US 9,427,102 B2
(45) Date of Patent: Aug. 30, 2016

(54) WINDOW TREATMENT ROD BRACKET

(71) Applicant: Rebecca Weaver, Wilmington, DE (US)

(72) Inventor: Rebecca Weaver, Wilmington, DE (US)

( * ) Notice: Subject to any disclaimer, the term of this patent is extended or adjusted under 35 U.S.C. 154(b) by 19 days.

(21) Appl. No.: 14/522,532

(22) Filed: Oct. 23, 2014

(65) Prior Publication Data

US 2016/0113428 A1    Apr. 28, 2016

(51) Int. Cl.
*A47H 1/10* (2006.01)
*A47H 1/142* (2006.01)
*F16M 13/02* (2006.01)

(52) U.S. Cl.
CPC .............. *A47H 1/142* (2013.01); *F16M 13/02* (2013.01)

(58) Field of Classification Search
CPC .............................. A47H 1/142; F16M 13/02
USPC ................................... 248/261–265, 251–252
See application file for complete search history.

(56) References Cited

U.S. PATENT DOCUMENTS

| | | | | |
|---|---|---|---|---|
| 1,444,463 A * | 2/1923 | Hughes | ..................... | E06B 9/50 248/271 |
| 3,135,489 A * | 6/1964 | Gledhill | ................. | A47H 1/122 160/345 |
| 3,885,268 A * | 5/1975 | Stieler | .................... | A47H 1/142 16/90 |
| 4,120,474 A * | 10/1978 | Hurley | ................... | A47H 1/124 16/93 D |
| 4,299,369 A * | 11/1981 | Colich, Sr. | ............. | A47H 1/122 248/256 |
| 4,928,743 A * | 5/1990 | Wojtysiak | ............... | E06B 9/262 160/330 |
| 5,383,511 A * | 1/1995 | Marasco | ................ | A47H 19/00 160/330 |
| 5,871,188 A * | 2/1999 | Lyle | ........................ | B66D 1/28 242/404 |
| 7,322,552 B1 * | 1/2008 | Lin | ........................ | A47H 1/122 160/89 |
| 2012/0217362 A1 * | 8/2012 | Affonso | ................. | A47H 1/142 248/222.14 |
| 2012/0228446 A1 * | 9/2012 | Mikovich | .............. | A47H 1/142 248/220.22 |
| 2013/0292349 A1 * | 11/2013 | Bucklew | ................ | A47H 1/022 211/105.2 |
| 2013/0313392 A1 * | 11/2013 | Sanchuk | ................ | A47H 1/142 248/254 |

* cited by examiner

*Primary Examiner* — Mark Wendell
(74) *Attorney, Agent, or Firm* — Gulf Coast Intellectual Property Group

(57) ABSTRACT

A window treatment hanging apparatus operable to releasably secure a window treatment rod bracket to a wall. The window treatment hanging apparatus further includes a body that is planar in manner and rectangular in shape. The body includes a central portion that is circumferentially border by a perimeter seam. The central portion having an inner surface and an outer surface. Opposite the perimeter seam and contiguous therewith are a plurality of foldable sections. The foldable sections include a plurality of vertical and horizontal foldable sections. The foldable sections are have a first position and a second position. In the second position, the plurality of foldable sections are operable to bias a wall plate of a conventional rod support bracket against the inner surface of the central portion. The outer surface of the central portion having an adhesive layer operable to secure the window treatment hanging apparatus to a wall.

20 Claims, 3 Drawing Sheets

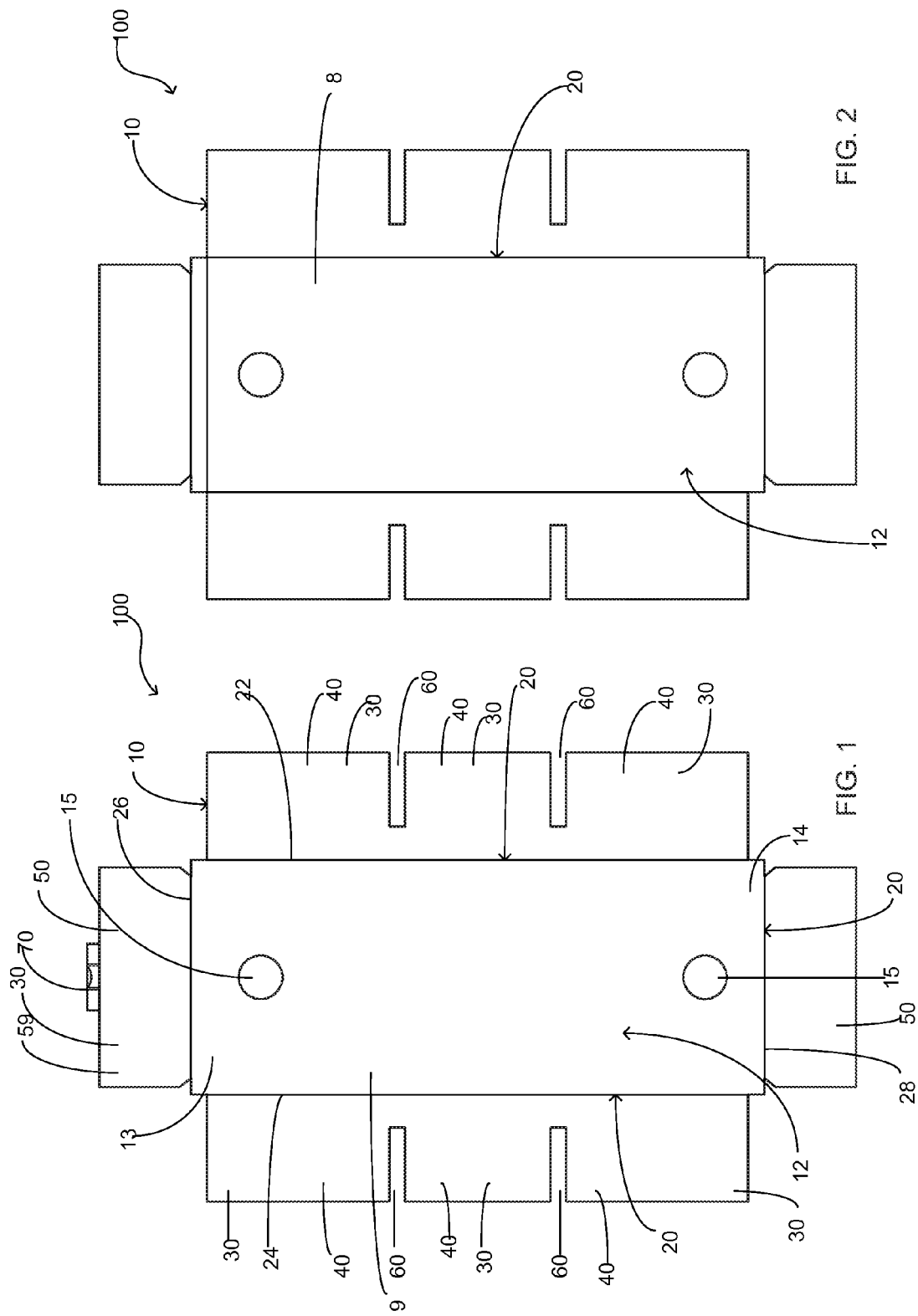

US 9,427,102 B2

WINDOW TREATMENT ROD BRACKET

FIELD OF THE INVENTION

The present invention relates generally to decorative window treatments, more specifically but not by way of limitation, a bracket operable to releasably secure a window treatment rod to a wall proximate a shelf that is secured using a releasable adhesive.

BACKGROUND

Interior decorating is a multi-billion dollar a year business in the United States alone. Whether it is for a commercial property or a single family residence decorating the interior of these structures includes a variety of tasks such as but not limited to choosing of flooring and painting the interior walls. One common task included in the art of interior decorating is installing decorative window treatments. Window treatments are available in numerous different styles and can include but are not limited to blinds, valances and drapes. Typically the style of the window treatment dictates how it will be mounted to the window or the walls adjacent thereto.

One style of window treatment that is very popular are drapes sometimes referred to as window curtains. Drapes are manufactured from variety of fabrics and colors and are suspendedly mounted proximate a window. Drapes are typically mounted utilizing a support rod or similar structure that is superposed the top of the window and extending substantially thereacross. The drapes are conventionally mounted to the support rod where they are movable between a first position and a second position so as either to cover the window or be linearly adjacent to each opposing side of the window.

During the mounting process of the drapes, the support rod typically requires a bracket that includes a wall plate. The wall plate often has apertures so as to accept fasteners therethrough in order to facilitate the mechanical mounting to the wall proximate the window. One problem with conventional securing techniques such as the aforementioned is that the walls are damaged from the fasteners used to secure the brackets. It is common for window treatments to be changed as a result of redecorating or moving. As the window treatments are removed the damaged walls remain and must be repaired.

Another issue with conventional installation techniques for support rods of window treatments is the cumbersome installation thereof. The conventional brackets require tools such as levels, screwdrivers and other implements in order to facilitate installation of the brackets. Additionally, conventional techniques often require more than one person to facilitate a proper installation of the brackets operable to engage a support rod for window treatments.

Accordingly, there is a need for a mounting apparatus that facilitates the mounting of a bracket for a support rod for a window treatment that is releasably secured with chemical adhesives and promotes easier installation thereof.

SUMMARY OF THE INVENTION

It is the object of the present invention to provide a window treatment rod mounting apparatus that is releasably secured to a wall using chemical adhesives.

Another object of the present invention is to provide a window treatment rod mounting apparatus that is planar in manner having a first side and a second side wherein the chemical adhesive is substantially disposed on the second side.

A further object of the present invention is to provide a window treatment rod mounting apparatus that is operable to suspend a window treatment support rod proximate a window that includes a plurality of sections wherein the sections are configured to be foldable.

An additional object of the present invention is to provide a window treatment rod mounting apparatus that is operable to releasably secure a bracket configured to engage a window treatment support rod that includes a central portion similar in size to the wall plate of a conventional rod mounting bracket.

Still another object of the present invention is to provide a window treatment rod mounting apparatus operable to releasably secure a conventional support rod bracket to a wall proximate a window wherein the central portion includes a perimeter seam that facilitates the folding of the plurality of foldable sections.

Yet a further object of the present invention is to provide a window treatment rod mounting apparatus that further includes a releasably secured level that is operable to assist in the level placement on a wall.

Another object of the present invention is to provide a window treatment rod mounting apparatus operable to releasably secured a conventional rod mounting bracket to a wall that includes a plurality of perimeter slots operable to facilitate the unobstructed folding of the foldable sections.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 1 is a view of the first side of an embodiment of the present invention; and FIG. 2 is a view of the second side of an embodiment of the present invention.

DETAILED DESCRIPTION

Figure 3:
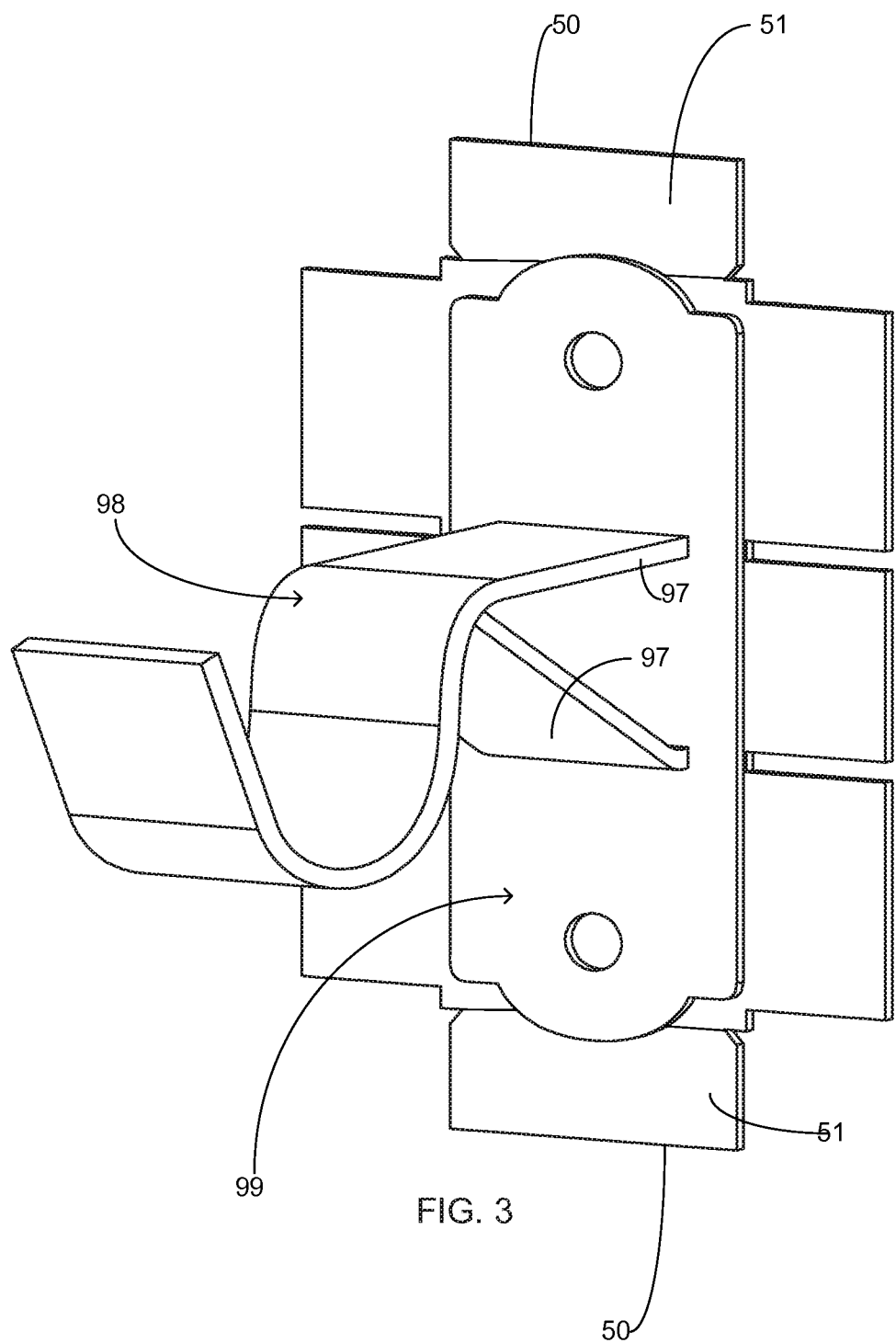
FIG. 3 is a perspective view of an embodiment of the present invention with a conventional bracket engaged therewith and the foldable sections in their first position.

Referring now to the drawings submitted herewith, wherein various elements depicted therein are not necessarily drawn to scale and wherein through the views and figures like elements are referenced with identical reference numerals, there is illustrated a window treatment rod mounting apparatus 100 constructed according to the principles of the present invention.

Referring in particular to FIGS. 1 and 2 herein, the window treatment rod mounting apparatus 100 includes a body 10 that is planar in manner being manufactured from a suitable durable material such as but not limited to plastic. The body 10 includes a central portion 12 that is rectangular in shape having a first end 13 and a second end 14. The central portion 10 is flat having apertures 15 proximate the first end 13 and second end 14. The central portion 10 is sized so as to receive adjacent thereagainst a conventional wall plate 99 of a window treatment rod support bracket 98. The central portion 12 further includes an adhesive disposed on the outer surface 9 thereof that is operable to releasably secure the wall plate 99 to the central portion 12. The central portion 12 comprises the center portion of the body 10 and is manufactured in a variety of sizes so as to accommodate an exemplary wall plate 99 of various dimensions. It is further contemplated within the scope of the present invention that the central portion 12, could be manufactured in numerous different shapes so as to mateably sized and shaped with a wall plate 99 of a conventional window treatment rod support bracket 98. More specifically but not by way of limitation, it is contemplated within the scope of the present invention that the central portion 12 could be square or annular in shape. It is further contemplated within the scope of the present invention that the body 10 could be formed in numerous different shapes so as to mateably align with various different shapes of wall plates 99.

As previously discussed herein the central portion 12 includes apertures 15 that are annular in shape. The apertures 15 are present to allow a user to fasten the body 10 to a wall with a mechanical fastener such as a screw if desired. While two apertures 15 are illustrated herein, it is contemplated within the scope of the present invention that the central portion 12 could have as few as one aperture 15 or more than two apertures 15. The central portion 12 is bordered by a perimeter seam 20. The perimeter seam 20 includes a first longitudinal seam 22 and a second longitudinal seam 24 extending substantially the length of the central portion 12 intermediate the first end 13 and second end 14. The perimeter seam 20 further includes an upper lateral seam 26 and a lower lateral seam 28 that are operably coupled and intermediate to the first longitudinal seam 22 and second longitudinal seam 24. The upper lateral seam 26 is proximate first end 13 and the lower lateral seam 28 is proximate the second end 14. The perimeter seam 20 is manufactured such that it facilitates the inward folding of the plurality of securing sections 30. It is contemplated within the scope of the present invention that the perimeter seam 20 could be manufactured in numerous different manners to accomplish the desired objective of the inward folding of the plurality of securing sections 30.

The securing sections 30 include the vertical securing sections 40 and the horizontal securing section 50. The vertical securing sections 40 extend the length of the body 10 and are present on both sides of the central portion 12. The vertical securing sections 40 function to fold inwards along perimeter seam 20 and superpose the wall plate 99. As the vertical securing sections 40 are folded inward and placed such that they are adjacent the wall plate 99, the pressure sensitive adhesive disposed on the surface of the vertical securing sections 40 will releasably secure the vertical securing sections 40 in place such that they remain in the folded position and as such assist in securing the wall plate 99 into the central portion 12. Intermediate the vertical securing sections 40 are a plurality of voids 60. The voids 60 are elongated and rectangular in shape and function to ensure that the vertical securing sections 40 can be folded such that they are against the wall plate 99 in their final position. The voids 60 allow support members 97 of the bracket to pass therethrough as the vertical securing sections 40 are folded into their second position such that the support members 97 do not inhibit the folding of the vertical securing sections 40 into their second position against the wall plate 99. While two voids are illustrated herein on each side of the body 10, it is contemplated within the scope of the present invention that the body 10 could include various different quantities of voids 60 in order to accommodate support members 97 that are arranged and/or present in different quantities.

The body 10 includes two horizontal securing sections 50 that function similarly to the vertical securing sections 40. The horizontal securing sections 50 are foldable inward towards the exemplary wall plate 99 and ultimately come to rest thereagainst in their final position so as to assist in the securing of the wall plate 99 to the central portion 12. The horizontal securing sections 50 have adhesive, such as but not limited to pressure sensitive adhesive disposed on the surface 51 in order to facilitate the securing of the horizontal securing sections 50 to the wall plate 99. While no particular order of folding is required, it is contemplated within the scope of the present invention that the horizontal securing sections 50 are folded to their second position such that they are adjacent the wall plate prior to the vertical securing sections 40 being folded into their second position.

FIG. 2 herein illustrates the second side, or back of the window treatment rod mounting apparatus 100. The central portion 12 of the body 10 includes an adhesive disposed substantially thereon (not illustrated herein). The adhesive layer disposed on the second side 8 of the central portion 12 functions to provide the releasable securing of the body 10 to a wall or other desired surface. Those skilled in the art will recognize that numerous types of adhesives could be utilized to achieve the desired functionality described herein. Utilizing an adhesive that is non-marring allows a user to temporarily install window treatments or facilitate easier installation thereof as no mechanical fasteners and/or tools are required.

In order to facilitate the improved installation of the window treatment rod mounting apparatus 100 a level 70 is releasably secured to the upper horizontal securing section 59. The level 70 is a small conventional bubble level having a liquid filled interior with a small air bubble therein. The level 70 provides a user an integrated technique to ensuring that the window treatment rod mounting apparatus 100 is placed against the desired wall in a level manner. It is contemplated within the scope of the present invention that subsequent the identification of a level orientation of the window treatment rod mounting apparatus 100 that the level 70 can be removed and the installation of the window treatment rod mounting apparatus 100 can be completed as described herein. While one level 70 is illustrated herein, it is contemplated within the scope of the present invention that the window treatment rod mounting apparatus 100 could have a second level to assist with the vertical leveling thereof during installation.

Figure 4:
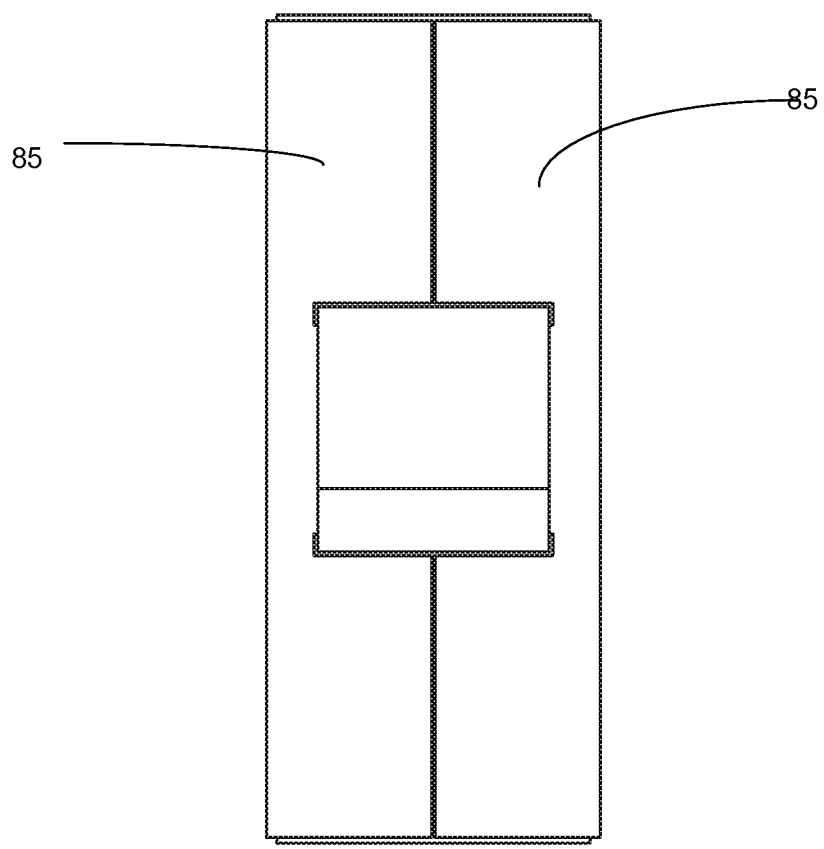
FIG. 4 is a front view of an embodiment of the present invention with a conventional bracket engaged therewith and the foldable sections in their second position.

FIG. 4 herein illustrates a window treatment rod mounting apparatus 100 wherein the horizontal securing sections 50 and vertical securing sections 40 have been folded into their section position and secured adjacent to wall plate 99. The window treatment rod mounting apparatus 100 provides a significant advantage over utilizing a conventional rod mounting bracket. Conventional rod mounting brackets typically utilize screws to secure the bracket to the wall. The weight distribution is such that much of the force is applied to the upper most screw and it is very common for this fastener to fail. As shown in FIG. 4, the window treatment rod mounting apparatus with the horizontal securing sections 50 and vertical securing sections 40 secured in their second position, provides distribution of the weight of a rod placed on the exemplary window treatment rod support bracket 98 so as to substantially reduce the probability of failure. The outer surface 85 of the vertical securing sections 40 further include a layer of decorative material, not particularly illustrated herein. The outer surface 85 is either painted or treated in a manner so as to match the décor proximate the installation of the window treatment rod mounting apparatus 100. More specifically but not by way of limitation the outer surface 85 could be nickel or bronze in order to match a support rod of a window treatment that is nickel or bronze.

Referring to the figures herein, a description of the operation of the window treatment rod mounting apparatus 100 is as follows. In use, a user will choose a window treatment rod mounting apparatus 100 that is manufactured having a mateable shape with the wall plate 99 of an exemplary window treatment rod support bracket 98. The wall plate 99 is then placed adjacent to the base are 12 of the body 10 and is secured thereto utilizing the adhesive layer disposed on the central portion 12. The horizontal securing sections 50 are folded towards the wall plate 99 and secured thereagainst. Prior to moving the upper horizontal securing section 59, if desired a user may utilize the level to orient and mark the desired location for the window treatment rod mounting apparatus 100. Ensuing the positioning of the horizontal securing sections 50, the vertical securing sections 40 are folded into their second position such that the wall plate 99 is now completely covered and secured within the central portion 12. Finally, the window treatment rod mounting apparatus 100 is placed in a desired position on a wall and secured with the adhesive disposed on the second side 8.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A window treatment hanging apparatus comprising:
   a body, said body being planar in manner, said body having a first side and a second side, said first side of said body having a central portion, said central portion having longitudinal edges, said central portion having lateral edges intermediate said longitudinal edges, said central portion having a shape operable to mate with a conventional wall plate of a conventional window treatment rod mounting bracket, said central portion configured to receive the conventional wall plate thereagainst;
   a perimeter seam, said perimeter seam circumferentially disposed around said central portion, said perimeter seam integrally formed into said body;
   a plurality of foldable sections, said plurality of foldable sections being contiguous with said perimeter seam, said plurality of foldable sections having a first position and a second position, said plurality of foldable sections configured to fold along said perimeter seam inward towards said central portion, said plurality of folding sections extending outward from said central portion of said body and being planar therewith in said first position, said plurality of foldable section being folded inward towards said central portion in said second position, said plurality of foldable sections operable to secure a conventional wall plate against said central portion in said second position; and
   wherein the window treatment hanging apparatus is operable to suspendedly mount a window treatment rod against a wall.

2. The window treatment hanging apparatus as recited in claim 1, wherein said second side of said body includes an adhesive layer, said adhesive layer operable to releasably secure the window treatment hanging apparatus to a wall.

3. The window treatment hanging apparatus as recited in claim 2, wherein said plurality of foldable sections further include vertical portions and horizontal portions, said vertical portions extending along the longitudinal edges of said central portion, said horizontal portions extending along said lateral edges of said central portion.

4. The window treatment hanging apparatus as recited in claim 3, and further including at least one aperture, said at least one aperture being journaled through said central portion.

5. The window treatment hanging apparatus as recited in claim 4, wherein said foldable sections include an inner surface and an outer surface, said outer surface having a decorative layer thereon, said decorative layer being different in color than said inner surface.

6. The window treatment hanging apparatus as recited in claim 5, and further including a plurality of voids, said voids being intermediate said plurality of foldable sections.

7. The window treatment hanging apparatus as recited in claim 6, and further including a level, said level being releasably secured to one of said horizontal portions of said plurality of foldable sections.

8. A window treatment hanging apparatus operable to releasably support a window treatment rod to a wall comprising:
   a body, said body being planar in manner, said body having a first side and a second side, said body being rectangular in shape, said body having a first end and a second end, said body having a central portion, said central portion having a left longitudinal edge and a right longitudinal edge, said central portion having a upper horizontal edge and a lower horizontal edge intermediate said left longitudinal edge and said right longitudinal edge, said central portion being of mateable size to a wall plate of a conventional rod support bracket;
   a perimeter seam, said perimeter seam being contiguously adjacent to said central portion of said body, said perimeter seam being circumferentially disposed said central portion;
   a plurality of foldable sections, said plurality of foldable sections being contiguous with said perimeter seam, said plurality of foldable sections having a first position and a second position, said plurality of folding sections extending outward from said central portion of said body and being planar therewith in said first position, said plurality of foldable sections having an inner surface and an outer surface, and
   wherein said plurality of said foldable sections are operable to bias a wall plate of a conventional rod support bracket against the base area in said second position.

9. The window treatment hanging apparatus as recited in claim 8, and further including an adhesive layer, said adhesive layer being superposed said second side of said body, said adhesive layer operable to releasably secure said body to a wall.

10. The window treatment hanging apparatus as recited in claim 9, and further including a plurality of voids, said voids being rectangular in shape, said plurality voids being intermediate said plurality of foldable sections, said plurality of voids operable to facilitate the moving of said plurality of foldable sections to said second position by avoiding support members present on a conventional rod support bracket.

11. The window treatment hanging apparatus as recited in claim 10, wherein said plurality of foldable sections includes a group of vertical foldable sections, said vertical foldable sections extending along said right longitudinal edge and said left longitudinal edge.

12. The window treatment hanging apparatus as recited in claim 11, wherein said plurality of foldable sections includes at least one upper horizontal foldable section and at least one lower horizontal foldable section, said at least one upper horizontal foldable section contiguous with said upper horizontal edge, said at least one lower horizontal foldable section contiguous with said lower horizontal edge.

13. The window treatment hanging apparatus as recited in claim 12, wherein the outer surface of said plurality of foldable sections further includes a decorative layer.

14. The window treatment hanging apparatus as recited in claim 13, and further including a level, said level being releasably secured to said at least one upper horizontal foldable section, said level operable to assist in the correct placement of the window treatment hanging apparatus on a wall.

15. A window treatment hanging apparatus operable to releasably support a window treatment rod to a wall comprising:
   a body, said body being planar in manner, said body having a first side and a second side, said body being rectangular in shape, said body having an outer edge, said body having a first end and a second end, said body having a central portion, said central portion having a left longitudinal edge and a right longitudinal edge, said central portion having a upper horizontal edge and a lower horizontal edge intermediate said left longitudinal edge and said right longitudinal edge, said central portion being of mateable size to a wall plate of a conventional rod support bracket;
   a perimeter seam, said perimeter seam being contiguously adjacent to said central portion of said body, said perimeter seam being circumferentially disposed said central portion;
   a plurality of foldable sections, said plurality of foldable sections being contiguous with said perimeter seam, said plurality of foldable sections having a first position and a second position, said plurality of folding sections extending outward from said central portion of said body and being planar therewith in said first position, said plurality of foldable sections having an inner surface and an outer surface,
   a plurality of voids, said voids being rectangular in shape, said plurality voids being intermediate said plurality of foldable sections, said plurality of voids extending from said outer edge of said body to said perimeter seam, said plurality of voids operable to facilitate the moving of said plurality of foldable sections to said second position and avoid support members present on a conventional rod support bracket; and
   wherein said plurality of said foldable sections are operable to bias a wall plate of a conventional rod support bracket against the base area in said second position.

16. The window treatment hanging apparatus as recited in claim 15, and further including an adhesive layer, said adhesive layer being superposed said second side of said body, said adhesive layer operable to releasably secure said body to a wall.

17. The window treatment hanging apparatus as recited in claim 16, wherein said plurality of foldable sections includes at least one upper horizontal foldable section and at least one lower horizontal foldable section, said at least one upper horizontal foldable section contiguous with said upper horizontal edge, said at least one lower horizontal foldable section contiguous with said lower horizontal edge.

18. The window treatment hanging apparatus as recited in claim 17, wherein the outer surface of said plurality of foldable sections further includes a decorative layer.

19. The window treatment hanging apparatus as recited in claim 18, and further including a level, said level being releasably secured to said at least one upper horizontal foldable section, said level operable to assist in the correct placement of the window treatment hanging apparatus on a wall.

20. The window treatment hanging apparatus as recited in claim 19, and further including at least one aperture, said at least one aperture being journaled through said central portion.

* * * * *